United States Patent
Kim

(10) Patent No.: US 11,843,286 B2
(45) Date of Patent: Dec. 12, 2023

(54) MOTOR

(71) Applicant: LG INNOTEK CO., LTD., Seoul (KR)

(72) Inventor: Seong Jin Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 216 days.

(21) Appl. No.: 17/277,377

(22) PCT Filed: Sep. 30, 2019

(86) PCT No.: PCT/KR2019/012690
§ 371 (c)(1),
(2) Date: Mar. 18, 2021

(87) PCT Pub. No.: WO2020/071699
PCT Pub. Date: Apr. 9, 2020

(65) Prior Publication Data
US 2021/0359560 A1    Nov. 18, 2021

(30) Foreign Application Priority Data

Oct. 1, 2018    (KR) .................. 10-2018-0116909

(51) Int. Cl.
*H02K 1/27* (2022.01)
*H02K 1/278* (2022.01)
*H02K 7/08* (2006.01)

(52) U.S. Cl.
CPC ............. *H02K 1/278* (2013.01); *H02K 7/083* (2013.01)

(58) Field of Classification Search
CPC .............................. H02K 1/278; H02K 7/083
USPC .................................................. 310/156.01
See application file for complete search history.

(56) References Cited

U.S. PATENT DOCUMENTS

| | | | |
|---|---|---|---|
| 2008/0211332 A1* | 9/2008 | Kataoka | H02K 11/20 310/71 |
| 2014/0346918 A1* | 11/2014 | Uchitani | H02K 15/022 29/598 |
| 2017/0040873 A1 | 2/2017 | Pyeon | |

FOREIGN PATENT DOCUMENTS

| | | | |
|---|---|---|---|
| CN | 102101609 | 6/2011 | |
| CN | 104426313 | 3/2015 | |
| EP | 2336064 A2 * | 6/2011 | ............. B65H 54/44 |
| JP | 2010-220356 | 9/2010 | |
| JP | 2011-101491 | 5/2011 | |
| JP | 2011-126639 | 6/2011 | |
| JP | 2015-012669 | 1/2015 | |

(Continued)

OTHER PUBLICATIONS

EP 2336064 machine translation; Kino et al. (Year: 2011).*

(Continued)

*Primary Examiner* — Terrance L Kenerly
(74) *Attorney, Agent, or Firm* — KED & Associates LLP

(57) ABSTRACT

An embodiment relates to a motor comprising: a shaft; a rotor coupled to the shaft; and a stator disposed on the outside of the rotor, wherein the rotor includes a rotor core and a plurality of magnets disposed on the outer circumferential surface of the rotor core, wherein the rotor core includes a first region coupled to the shaft and a second region disposed on the outside of the first region, and wherein the upper or lower portion of the second region radially overlaps a bearing coupled to the shaft. Accordingly, the size of the motor can be reduced compared to the conventional art.

20 Claims, 8 Drawing Sheets

(56) References Cited

FOREIGN PATENT DOCUMENTS

| | | |
|---|---|---|
| JP | 2015-039272 | 2/2015 |
| JP | 2017-034779 | 2/2017 |
| KR | 10-2018-0005911 | 1/2018 |

OTHER PUBLICATIONS

International Search Report dated Jan. 10, 2020 issued in Application No. PCT/KR2019/012690.
Chinese Office Action dated Apr. 22, 2023 issued in Application No. 201980065191.0.
Korean Office Action dated Oct. 5, 2023, issued in Application No. KR 10-2018-0116909.

\* cited by examiner

[FIG. 1]
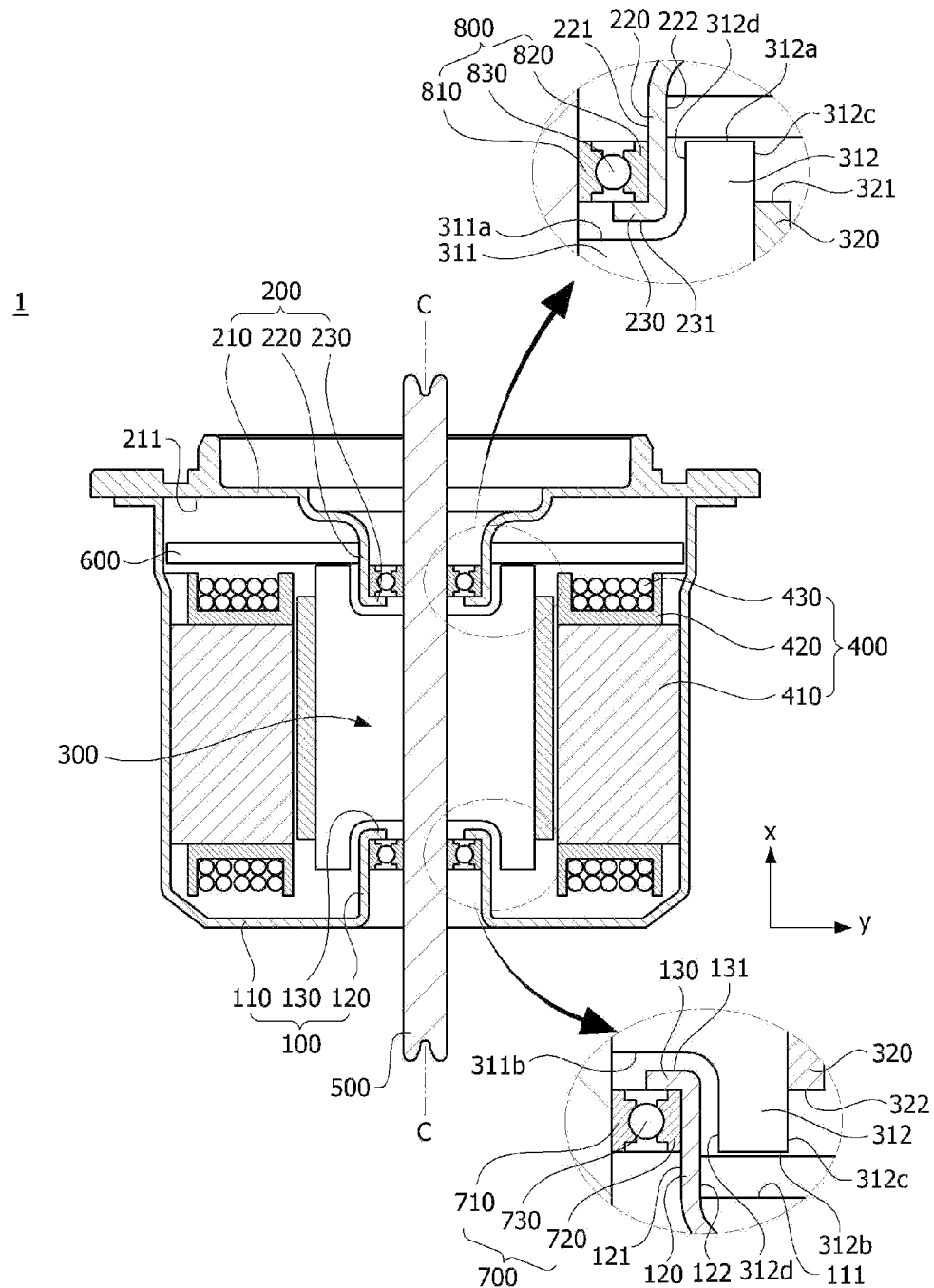

[FIG. 2]
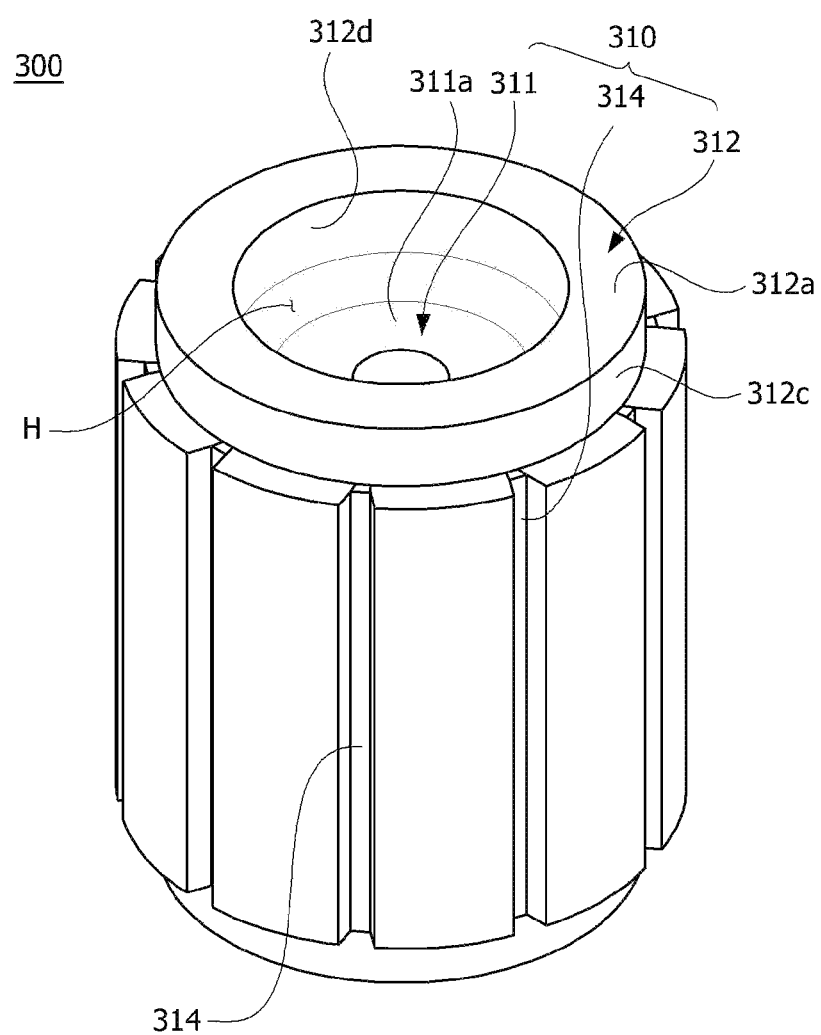

[FIG. 3]
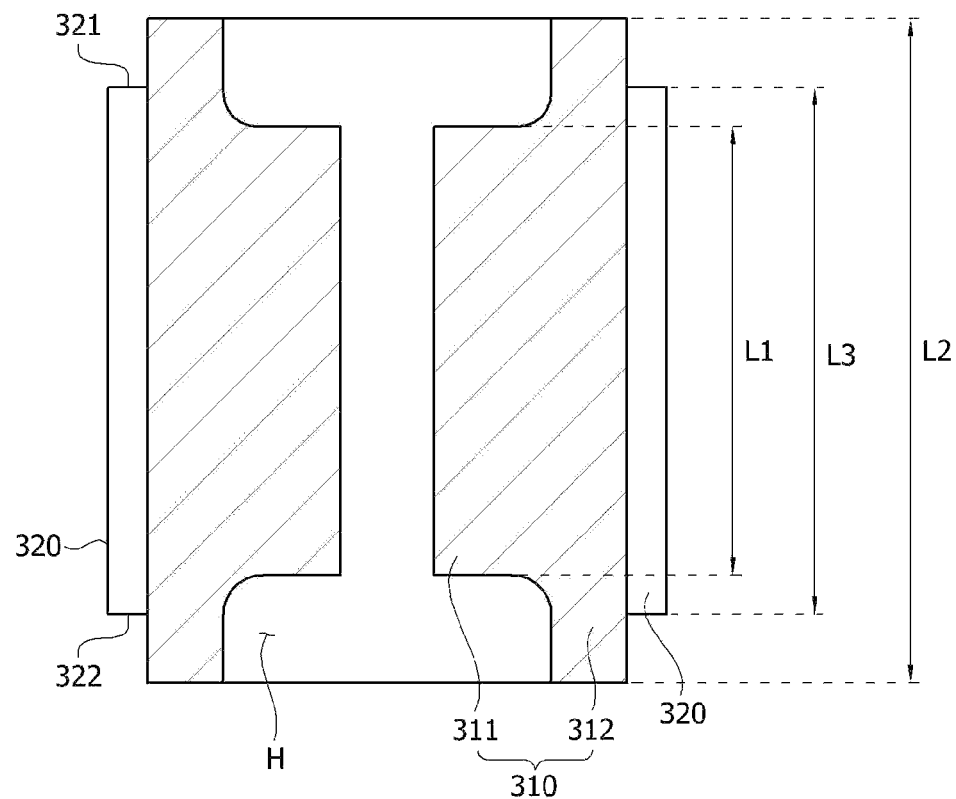

[FIG. 4]
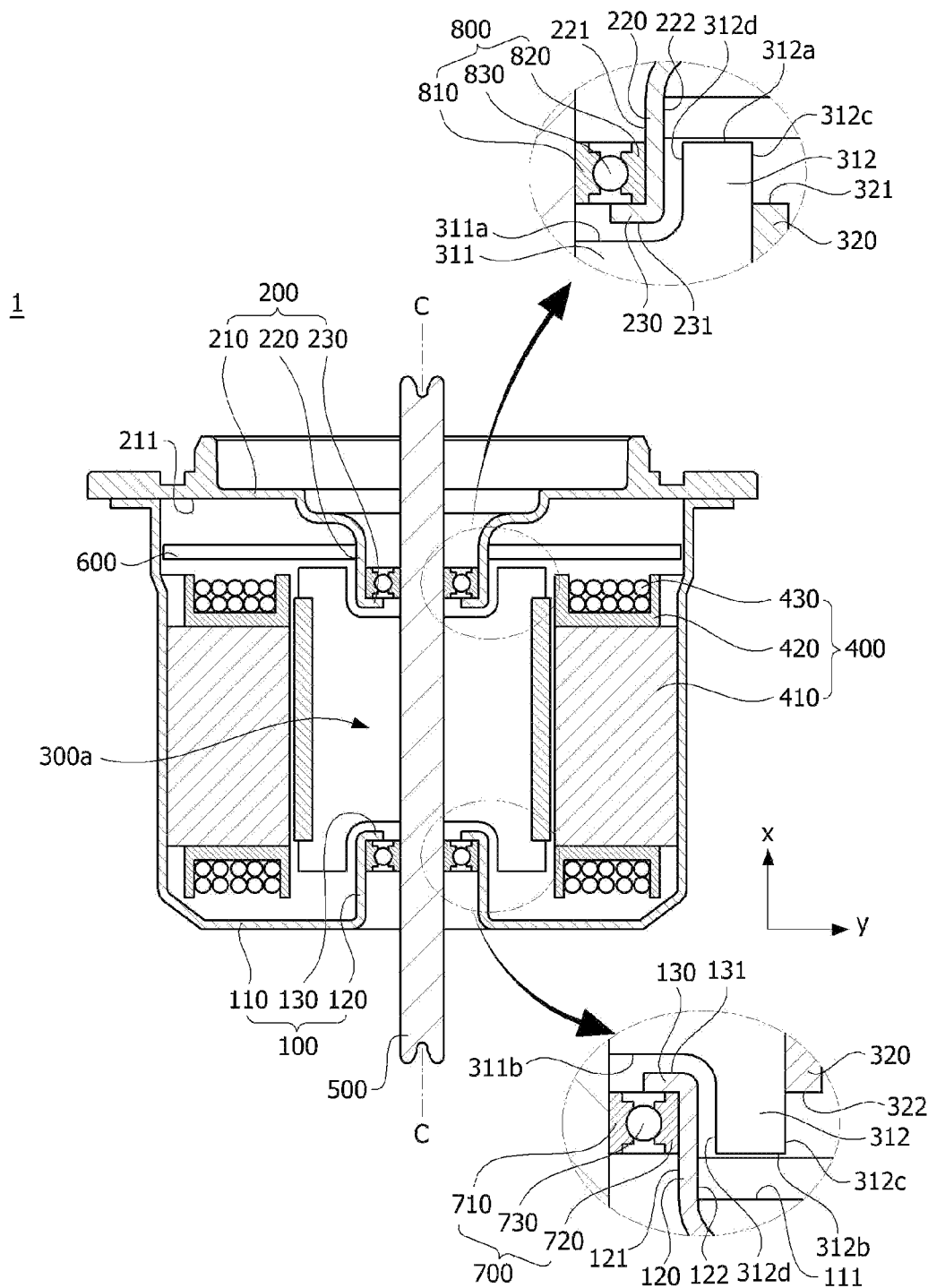

[FIG. 5]
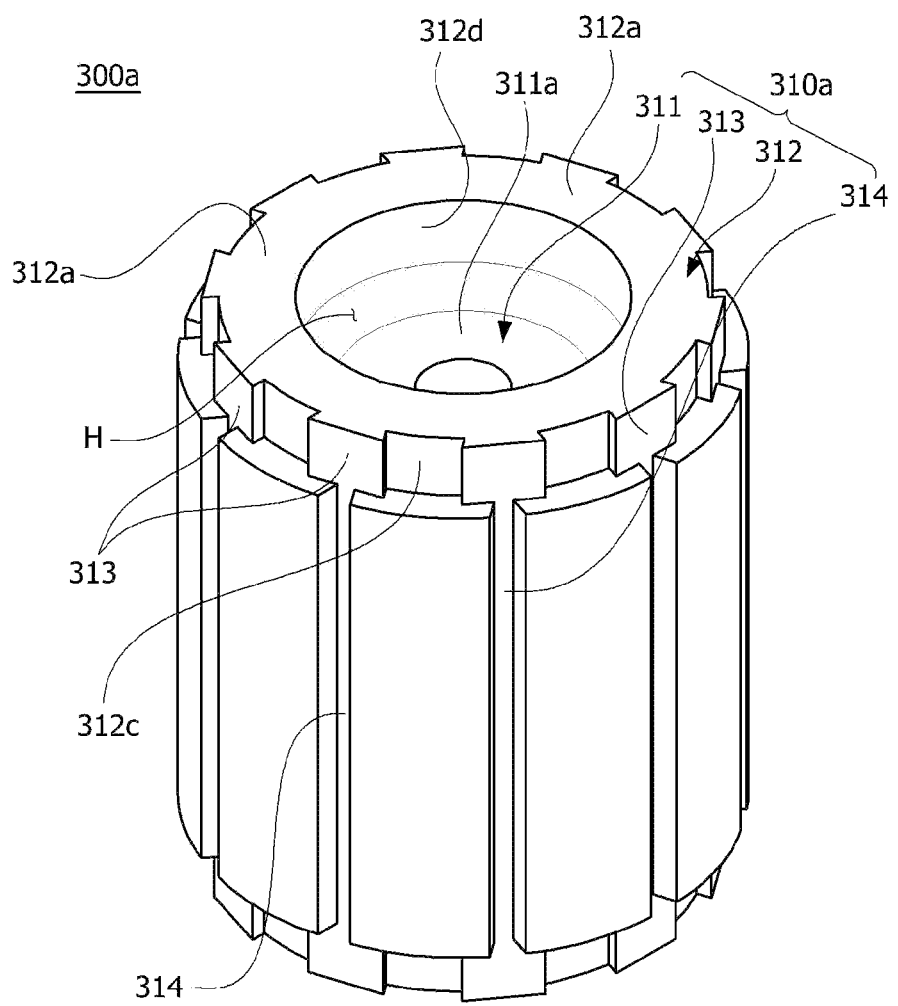

[FIG. 6]
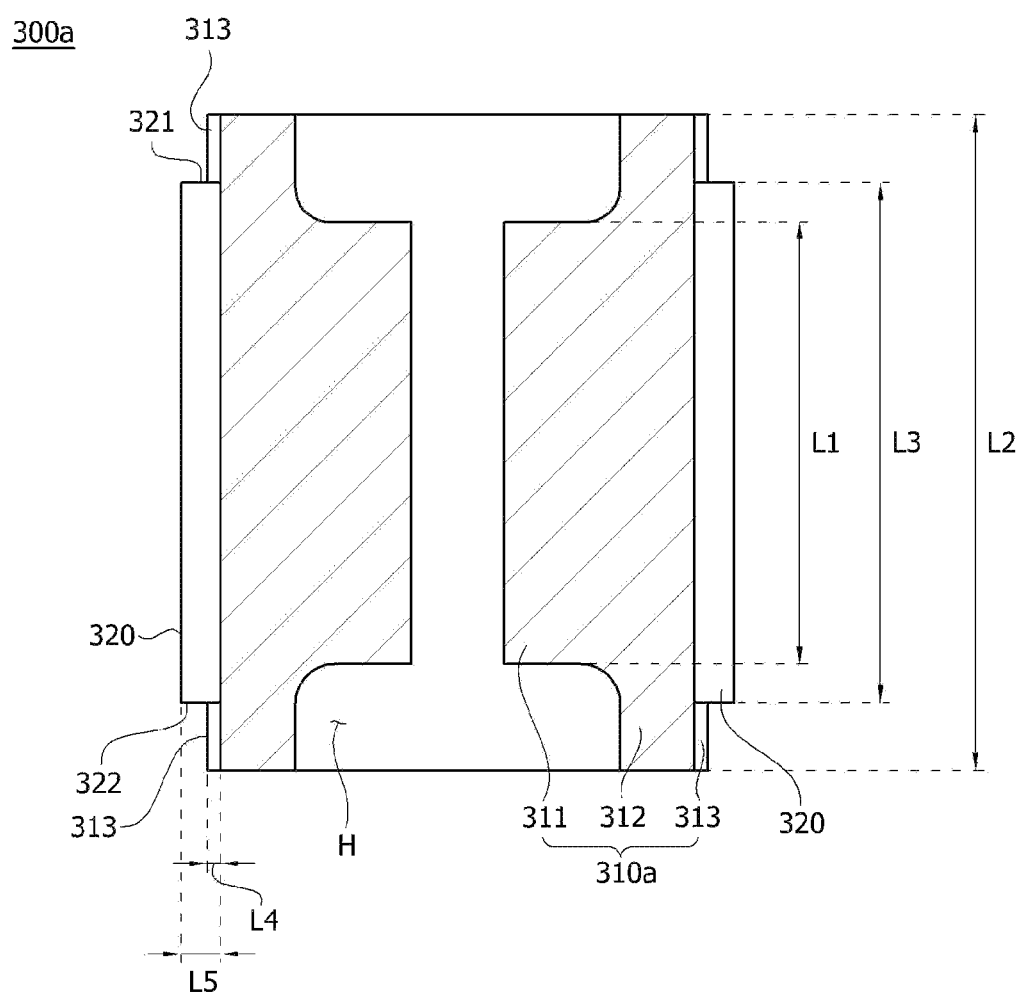

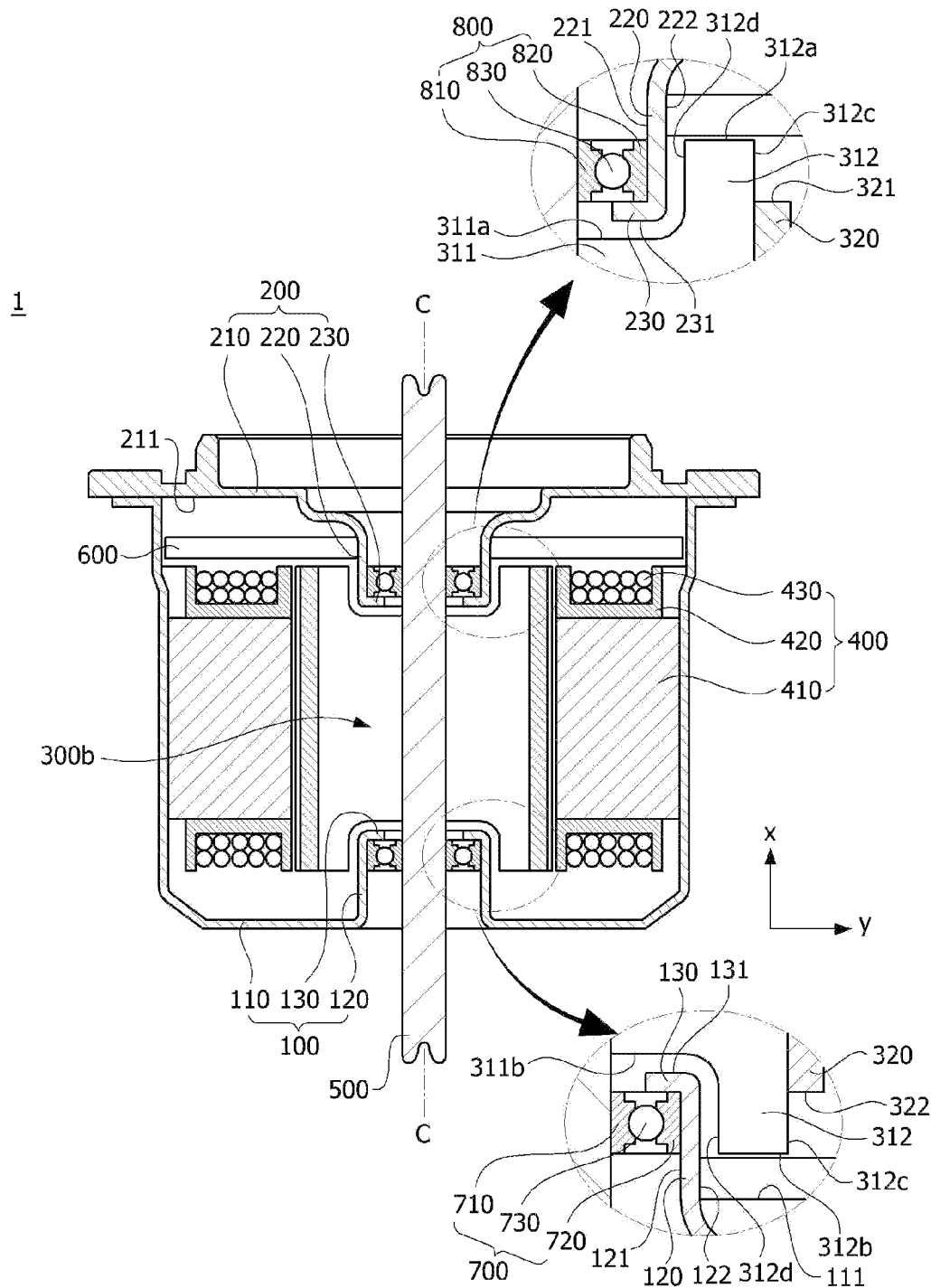
[FIG. 7]

[FIG. 8]
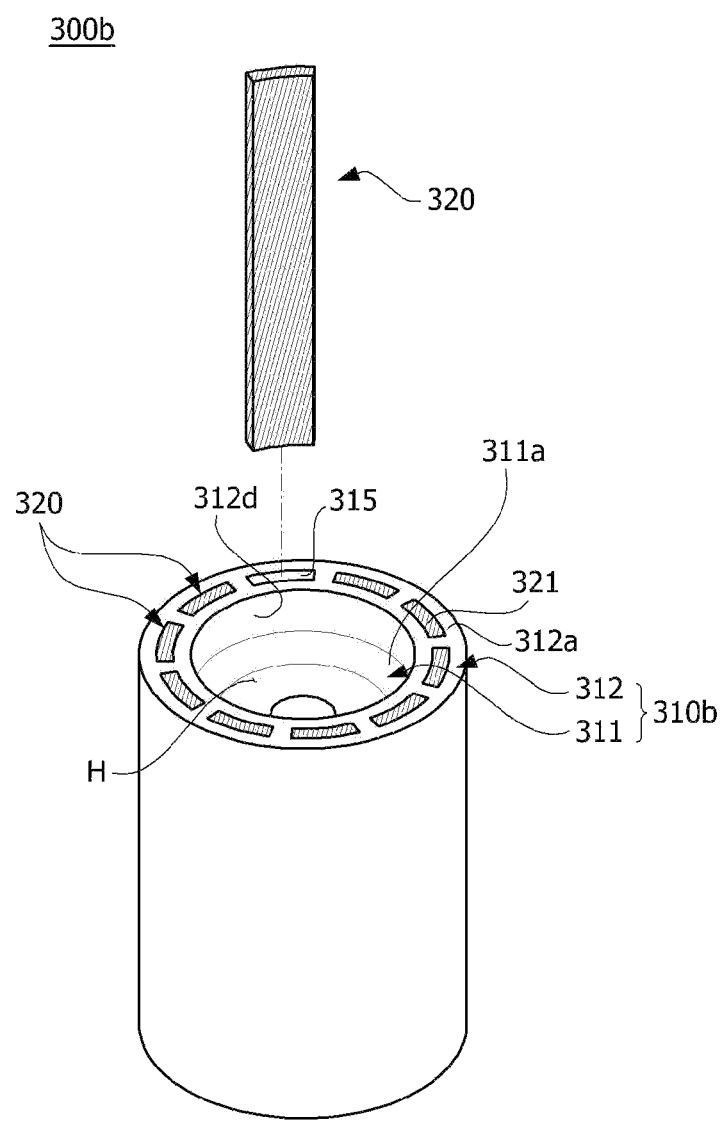

MOTOR

CROSS-REFERENCE TO RELATED PATENT APPLICATIONS

This application is a U.S. National Stage Application under 35 U.S.C. § 371 of PCT Application No. PCT/KR2019/012690, filed Sep. 30, 2019, which claims priority to Korean Patent Application No. 10-2018-0116909, filed Oct. 1, 2018, whose entire disclosures are hereby incorporated by reference.

TECHNICAL FIELD

The present invention relates to a motor.

BACKGROUND ART

Motors are apparatuses configured to convert electrical energy to mechanical energy to obtain rotational forces and are widely used for vehicles, home appliances, industrial machines, and the like.

A motor may include a housing, a shaft, a stator disposed in the housing, a rotor installed on an outer circumferential surface of the shaft, and the like. In this case, an electrical interaction is induced between the stator and the rotor so that the rotor rotates.

Bearings may be disposed on an upper portion and a lower portion of the shaft. In this case, since the bearings are disposed above and below the rotor core, there is a limitation in reduction of a size of the motor in a shaft direction.

That is, in a current situation in which miniaturization of a motor is required without degrading the performance of the motor, since a minimum height for arranging magnets is necessary in the rotor, there is the limitation in reduction of the size of the motor in the shaft direction.

Technical Problem

The present invention is directed to providing a motor in which bearings are disposed in grooves formed in a rotor core so that a size of the motor is reduced.

Objectives to be solved by the present invention are not limited to the above-described objectives, and other objectives which are not described above will be clearly understood by those skilled in the art from the following specification.

Technical Solution

One aspect of the present invention provides a motor including a shaft, a rotor coupled to the shaft, and a stator disposed outside the rotor to correspond to the rotor, wherein the rotor includes a rotor core and a plurality of magnets disposed on an outer circumferential surface of the rotor core, the rotor core includes a first region coupled to the shaft and a second region disposed outside the first region, and an upper portion or lower portion of the second region overlaps a bearing coupled to the shaft in a radial direction.

A length (L1) of the first region in a shaft direction may be smaller than a length (L2) of the second region in the shaft direction.

Another aspect of the present invention provides a motor including a shaft, a rotor coupled to the shaft, and a stator disposed outside the rotor to correspond to the rotor, wherein the rotor includes a rotor core and a plurality of magnets disposed on an outer circumferential surface of the rotor core, a groove is concavely formed inside the rotor core, and a bearing coupled to the shaft is disposed in the groove.

The rotor core may include a first region coupled to the shaft and a second region disposed outside the first region, and a length (L1) of the first region in a shaft direction may be smaller than a length (L2) of the second region in the shaft direction. In this case, the groove may be disposed inside the second region.

A length (L3) of the magnet in the shaft direction may be greater than the length (L1) of the first region in the shaft direction and smaller than the length (L2) of the second region in the shaft direction.

An upper surface of the magnet may be disposed between an upper surface of the first region and an upper surface of the second region in the shaft direction.

The rotor core may include a plurality of first protrusions protruding from an upper portion and a lower portion of an outer circumferential surface of the second region in the radial direction, and the magnets may be disposed between the first protrusions to be in contact with the first protrusions in the shaft direction.

The rotor core may include a plurality of second protrusions protruding from the outer circumferential surface of the second region in the radial direction, and the second protrusions may be disposed between the magnets in a circumferential direction.

The first protrusion may be formed to protrude from each of an upper portion and a lower portion of the second protrusion in the circumferential direction. In this case, a protruding length (L4) of the first protrusion in the radial direction may be smaller than a protruding length (L5) of the magnet in the radial direction. Accordingly, a length of the first protrusion and a length of the second protrusion in the radial direction may be smaller than a length of the magnet in the radial direction.

The motor may further include a housing in which the stator and the rotor are accommodated, wherein the bearing may include a first bearing disposed on a lower portion of the shaft and a second bearing disposed on an upper portion of the shaft, and the first bearing may be disposed inside a housing protruding portion protruding upward from a lower surface of the housing.

The housing may include a third protrusion protruding inward from an upper end of the housing protruding portion, and the third protrusion may be in contact with an outer wheel of the first bearing.

In a state in which the shaft is disposed in the housing, the first bearing may be press-fitted into the housing protruding portion from a lower side of the housing.

The motor may further include a cover disposed on the housing, wherein the second bearing is disposed inside a cover protruding portion protruding downward from a lower surface of the cover.

The cover may include a fourth protrusion protruding inward from a lower end of the cover protruding portion, and the fourth protrusion may be in contact with an outer wheel of the second bearing.

Still another aspect of the present invention provides a motor including a shaft, a rotor coupled to the shaft, and a stator disposed outside the rotor, wherein the rotor includes a rotor core and a plurality of magnets disposed on an outer circumferential surface of the rotor core, the rotor core includes a first region coupled to the shaft and a second region disposed outside the first region, the magnets are disposed in holes formed in the second region in a shaft direction, and an upper portion or lower portion of the second region overlaps a bearing coupled to the shaft in a radial direction.

Advantageous Effects

In a motor having the above-described structure according to embodiments, since bearings are disposed in grooves formed in a rotor core, a size of the motor can be reduced in a shaft direction.

In addition, movement of magnets can be prevented and arrangement positions of the magnets can be determined using a first protrusion and a second protrusion.

In addition, a third protrusion disposed on a housing can serve as a stopper so that a first bearing is disposed at a preset position.

In addition, a fourth protrusion disposed on a cover can serve as a stopper so that a second bearing is disposed at a preset position.

Various useful advantages and effects of the embodiments are not limited to the above-described contents and will be more easily understood from descriptions of the specific embodiments.

DESCRIPTION OF DRAWINGS

FIG. 1 is a view illustrating an example of a motor in which a rotor is disposed according to a first embodiment.

FIG. 2 is a perspective view illustrating the rotor according to the first embodiment.

FIG. 3 is a cross-sectional view illustrating the rotor according to the first embodiment.

FIG. 4 is a view illustrating an example of a motor in which a rotor is disposed according to a second embodiment.

FIG. 5 is a perspective view illustrating the rotor according to the second embodiment.

FIG. 6 is a cross-sectional view illustrating the rotor according to the second embodiment.

FIG. 7 is a view illustrating an example of a motor in which a rotor is disposed according to a third embodiment.

FIG. 8 is a perspective view illustrating the rotor according to the third embodiment.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Hereinafter, example embodiments of the invention will be described in detail with reference to the accompanying drawings. Components that are the same or correspond to each other will be denoted by the same reference numerals regardless of the figure numbers, and redundant descriptions will be omitted.

FIG. 1 is a view illustrating an example of a motor in which a rotor is disposed according to a first embodiment, FIG. 2 is a perspective view illustrating the rotor according to the first embodiment, and FIG. 3 is a cross-sectional view illustrating the rotor according to the first embodiment. In FIG. 1, an x direction is referred to as a shaft direction, and a y direction is referred to as a radial direction. In addition, the shaft direction is perpendicular to the radial direction. In this case, the shaft direction may denote a longitudinal direction of the shaft.

Referring to FIG. 1, a motor 1 according to the embodiment may include a housing 100 in which an opening is formed at one side thereof, a cover 200 disposed on the housing 100, a rotor 300 coupled to a shaft 500, a stator 400 disposed in the housing 100, the shaft 500 configured to rotate with the rotor 300, a busbar 600 disposed above the stator 400, and bearings disposed on an upper portion and a lower portion of the shaft 500. In this case, the bearings may include a first bearing 700 disposed on the lower portion of the shaft 500 and a second bearing 800 disposed on the upper portion of the shaft 500.

In addition, the rotor 300 may be disposed inside the stator 400 in the motor 1. In this case, the term "inside" may refer to a direction toward a center C when viewed from above, and the term "outside" may refer to a direction opposite to "inside."

In the rotor 300 of the motor 1, a size of the motor 1 in the shaft direction may be reduced by arranging at least one of the bearings in a groove H formed in a rotor core 310. In this case, an entirety or one portion of the bearing may be disposed in the groove H to adjust the size of the motor 1 in the shaft direction.

In addition, a leakage of a magnetic flux is prevented by the groove H.

Meanwhile, the motor 1 may be used as a motor used in an electronic power steering (EPS) system. The EPS system may assist a steering force using a driving force of the motor to secure turning stability and provide a rapid restoring force. Accordingly, a driver of the vehicle can travel safely.

The housing 100 and the cover 200 may form an exterior of the motor 1. In addition, the housing 100 may be coupled to the cover 200 to form an accommodation space. Accordingly, as illustrated in FIG. 1, the rotor 300, the stator 400, the shaft 500, the busbar 600, and the like may be disposed in the accommodation space. In this case, the shaft 500 is rotatably disposed in the accommodation space. Accordingly, the motor 1 may further include the bearings 700 and 800 disposed on the upper portion and the lower portion of the shaft 500.

The housing 100 may be formed in a cylindrical shape. In addition, the rotor 300, the stator 400, and the like may be accommodated in the housing 100. In this case, the shape or a material of the housing 100 may be variously changed. For example, the housing 100 may be formed of a metal material which firmly withstands even high temperatures.

Referring to FIG. 1, the housing 100 may include a housing body 110, a housing protruding portion 120 protruding upward from a lower surface 111 formed in the housing body 110, and a third protrusion 130 protruding inward from an upper end of the housing protruding portion 120. In this case, the housing body 110, the housing protruding portion 120, and the third protrusion 130 may be integrally formed.

The housing body 110 may be formed in a cylindrical shape, and the lower surface 111 may be formed in the housing body 110.

The housing protruding portion 120 may be formed to protrude upward from the lower surface 111. Accordingly, the housing protruding portion 120 may be provided as an accommodation groove in which the first bearing 700 is accommodated.

As illustrated in FIG. 1, an inner circumferential surface 121 of the housing protruding portion 120 may be disposed in contact with an outer circumferential surface of an outer wheel 720 of the first bearing 700. Accordingly, since the housing protruding portion 120 supports one side of the first bearing 700, the shaft 500 may be rotatably disposed in the housing 100 due to the first bearing 700.

The third protrusion 130 may be formed to protrude inward from the upper end of the housing protruding portion 120. In this case, as illustrated in FIG. 1, the third protrusion 130 may be formed to have a predetermined length so as to be in contact with the outer wheel 720 of the first bearing 700.

Accordingly, when the first bearing 700 is press-fitted into the housing protruding portion 120 from a lower side of the housing 100 in a state in which the shaft 500 is disposed in the housing 100, the third protrusion 130 may serve as a stopper so that the first bearing 700 is disposed at a preset position.

In addition, even when the first bearing 700 is excessively press-fitted into the housing protruding portion 120, the third protrusion 130 may support the first bearing 700 to prevent the first bearing 700 from coming into contact with the rotor 300.

The cover 200 may be disposed on an open surface of the housing 100, that is, an upper portion of the housing 100, to cover an opening of the housing 100. In this case, a shape or material of the cover 200 may be variously changed. For example, the cover 200 may be formed of a metal material which firmly withstands even high temperatures.

Referring to FIG. 1, the cover 200 may include a cover body 210, a cover protruding portion 220 protruding from a lower surface 211 formed in the cover body 210, and a fourth protrusion 230 protruding inward from a lower end of the cover protruding portion 220. In this case, the cover body 210, the cover protruding portion 220, and the fourth protrusion 230 may be integrally formed.

The cover body 210 may be formed in a plate shape, and the lower surface 211 may be formed at a lower side of the cover body 210.

The cover protruding portion 220 may be formed to protrude from the lower surface 211. Accordingly, the cover protruding portion 220 may be provided as an accommodation groove in which the second bearing 800 is accommodated.

As illustrated in FIG. 1, an inner circumferential surface 221 of the cover protruding portion 220 may be disposed in contact with an outer circumferential surface of an outer wheel 820 of the second bearing 800. Accordingly, since the cover protruding portion 220 supports one side of the second bearing 800, the shaft 500 may be rotatably disposed in the cover 200 due to the second bearing 800.

The fourth protrusion 230 may be formed to protrude inward from the lower end of the cover protruding portion 220. In this case, as illustrated in FIG. 1, the fourth protrusion 230 may be formed to have a predetermined length to be in contact with an outer wheel 820 of the second bearing 800.

Accordingly, when the second bearing 800 is press-fitted into the cover protruding portion 220 from an upper side of the cover 200 in a state in which the shaft 500 is disposed in the cover 200, the fourth protrusion 230 may serve as a stopper so that the second bearing 800 is disposed at a preset position.

In addition, even when the second bearing 800 is excessively press-fitted into the cover protruding portion 220, the fourth protrusion 230 may support the second bearing 800 to prevent the second bearing 800 from coming into contact with the rotor 300.

The rotor 300 is rotated due to an electrical interaction with the stator 400. In this case, the rotor 300 is disposed inside the stator 400. In addition, the shaft 500 may be coupled to a central portion of the rotor 300 in a press-fitting manner.

FIG. 2 is the perspective view illustrating the rotor according to the first embodiment, and FIG. 3 is the cross-sectional view illustrating the rotor according to the first embodiment.

Referring to FIGS. 2 and 3, the rotor 300 according to the first embodiment may include the rotor core 310 and a plurality of magnets 320 disposed on an outer circumferential surface of the rotor core.

The plurality of magnets 320 may be disposed on the outer circumferential surface of the rotor core 310 in a circumferential direction. For example, the plurality of magnets 320 may be disposed on the outer circumferential surface of the rotor core 310 to be spaced at preset intervals. In this case, the magnets 320 may be referred to as rotor magnets or drive magnets.

The rotor core 310 may be formed in a form in which a plurality of circular thin steel plates are stacked or a single cylindrical form. In addition, a hole coupled to the shaft 500 may be formed at a center C of the rotor core 310.

Referring to FIGS. 2 and 3, the rotor core 310 may include a first region 311, a second region 312 disposed outside the first region 311, and second protrusions 314 formed to protrude from an outer circumferential surface of the second region 312. In this case, a length L1 of the first region 311 in the shaft direction may be smaller than a length L2 of the second region 312 in the shaft direction. In addition, the length L1 of the first region 311 in the shaft direction may be greater than a difference (L2−L1) between the length L2 of the second region 312 in the shaft direction and the length L1 of the first region 311 in the shaft direction. In this case, the length in the shaft direction may be referred to as a height in the shaft direction or a width in the shaft direction.

In addition, since a step is formed between the first region 311 and the second region 312, the groove H may be formed inside the rotor core 310. In addition, the first bearing 700 or the second bearing 800 may be disposed in the groove H.

That is, the rotor core 310 may include the groove H concavely formed from an upper surface or lower surface of the rotor core 310 in the shaft direction. In addition, the bearing 700 or 800 coupled to the shaft 500 may be disposed in the groove H.

The first region 311 of the rotor core 310 may be formed in a cylindrical shape in which a hole may be formed at the center thereof to be coupled to the shaft 500.

In addition, the second bearing 800 is disposed above an upper surface 311a of the first region 311 to be spaced apart from the upper surface 311a, and the first bearing 700 is disposed under the lower surface 311b of the first region 311 to be spaced apart from the lower surface 311b.

In this case, the third protrusion 130 is disposed between the lower surface 311b of the first region 311 and the first bearing 700, and an upper surface 131 of the third protrusion 130 is disposed to be space apart from the lower surface 311b of the first region 311 by a predetermined first distance. In this case, the first distance may serve as a buffer space which prevents the third protrusion 130 from coming into contact with the lower surface 311b of the first region 311, which may occur due to deformation of the third protrusion 130 when the first bearing 700 is press-fitted into the rotor core 310.

In addition, the fourth protrusion 230 is disposed between the upper surface 311a of the first region 311 and the second bearing 800, and a lower surface 231 of the fourth protrusion 230 is disposed to be spaced apart from the upper surface 311a of the first region 311 by a predetermined second distance. In this case, the second distance may serve as a buffer space which prevents the fourth protrusion 230 from coming into contact with the upper surface 311a of the first region 311, which may occur due to deformation of the fourth protrusion 230 when the second bearing 800 is press-fitted into the rotor core 310.

In this case, the first distance may be the same as the second distance but may also be different from the second distance in consideration of a size of the motor 1 in the shaft direction and a design of the motor 1.

The second region 312 is disposed outside the first region 311.

In this case, the length L2 of the second region 312 in the shaft direction may be greater than the length L1 of the first region 311 in the shaft direction. Accordingly, the first bearing 700 or the second bearing 800 may be disposed inside the second region 312.

Accordingly, an upper portion or lower portion of the second region 312 may overlap the bearing coupled to the shaft 500 in the radial direction. For example, the upper portion of the second region 312 may overlap an entirety or one portion of the second bearing 800 in the radial direction. In addition, the lower portion of the second region 312 may overlap an entirety or one portion of the first bearing 700 in the radial direction.

In addition, the housing protruding portion 120 is disposed between an inner circumferential surface 312d of the second region 312 and the first bearing 700, and an outer circumferential surface 122 of the housing protruding portion 120 is disposed to be spaced apart from the inner circumferential surface 312d of the second region 312 by a predetermined third distance. Accordingly, when the rotor 300 rotates, the inner circumferential surface 312d of the second region 312 does not come into contact with the housing protruding portion 120.

In addition, the cover protruding portion 220 is disposed between the inner circumferential surface 312d of the second region 312 and the second bearing 800, and the outer circumferential surface 222 of the cover protruding portion 220 is disposed to be spaced apart from the inner circumferential surface 312d of the second region 312 by a predetermined fourth distance. Accordingly, when the rotor 300 rotates, the inner circumferential surface 312d of the second region 312 does not come into contact with the cover protruding portion 220.

In this case, the third distance may be the same as the fourth distance.

The second protrusions 314 guide an arrangement of the magnets 320. In addition, when the motor 1 is driven, the second protrusions 314 prevent the magnets 320 from moving in the circumferential direction. In this case, the second protrusions 314 may be referred to as magnet guides.

Referring to FIG. 2, the second protrusions 314 may be formed to protrude from an outer circumferential surface 312c of the second region 312 in the radial direction. In this case, the plurality of second protrusions 314 may be disposed to be spaced apart from each other in the circumferential direction. Accordingly, the magnets 320 may be disposed between the second protrusions 314 in the circumferential direction.

In this case, based on the outer circumferential surface 312c of the rotor core 310, a protruding length of the second protrusion 314 in the radial direction is smaller than a length L5 of the magnet 320 in the radial direction.

In this case, although an example in which the rotor core 310 includes the second protrusions 314 is described, the present invention is not necessarily limited thereto. For example, the second protrusions 314 may be removed from the rotor core 310. However, in the case in which the second protrusion 314 is formed on the rotor core 310, since a region on which an adhesive member (not shown) is sprayed is extended, a fixing force of the magnet 320 may be increased by the second protrusion 314.

The magnets 320 may be disposed on the outer circumferential surface 312c of the rotor core 310 to be spaced apart from each other at preset intervals. In this case, the magnets 320 may be attached on the outer circumferential surface 312c of the rotor core 310 using an adhesive member such as glue.

Referring to FIG. 3, a length L3 of the magnet 320 in the shaft direction may be greater than the length L1 of the first region 311 in the shaft direction and smaller than the length L2 of the second region 312 in the shaft direction but is not necessarily limited thereto.

As illustrated in FIG. 3, an upper surface 321 of the magnet 320 may be disposed between the upper surface 311a of the first region 311 and an upper surface 312a of the second region 312 in the shaft direction. In addition, a lower surface 322 of the magnet 320 may be disposed between the lower surface 311b of the first region 311 and a lower surface 312b of the second region 312 in the shaft direction.

Since the length L3 of the magnet 320 in the shaft direction is greater than the length L1 of the first region 311 in the shaft direction, one region of the magnet 320 is disposed to overlap the groove H in the radial direction. Accordingly, a leakage of the magnetic flux is prevented due to the groove H.

The stator 400 may be disposed inside the housing 100. In this case, the stator 400 may be supported by an inner circumferential surface of the housing 100. In addition, the stator 400 is disposed outside the rotor 300. That is, the rotor 300 may be disposed inside the stator 400.

Referring to FIG. 3, the stator 400 may include a stator core 410, insulators 420 disposed on the stator core 410, and coils 430 wound around the insulators 420.

The coils 430 configured to generate a rotating magnetic field may be wound around the stator core 410. In this case, the stator core 410 may be formed as one core or a plurality of divided cores that are coupled.

The stator core 410 may be formed in a form in which a plurality of thin steel sheets are stacked on each other but is not necessarily limited thereto. For example, the stator core 410 may be formed as one single product.

The stator core 410 may include a yoke (not shown) having a cylindrical shape and a plurality of teeth (not shown) protruding from the yoke in the radial direction. In addition, the coil 430 may be wound around the tooth.

The insulator 420 insulates the stator core 410 from the coil 430. Accordingly, the insulator 420 may be disposed between the stator core 410 and the coil 430.

Accordingly, the coil 430 may be wound around the stator core 410 on which the insulator 420 is disposed.

Meanwhile, the rotor 300 may further include a can (not shown) disposed to cover the rotor core 310 to which the magnets 320 are attached.

The can may protect the rotor core and the magnets from external shocks and physical and chemical stimuli while preventing foreign materials from being introduced to the rotor core and magnets.

In addition, the can prevents the magnets from being separated from the rotor core.

The shaft 500 may be disposed in the housing 100 to be rotatable by the bearings. In addition, the shaft 500 may rotate in conjunction with rotation of the rotor 300.

The shaft 500 may be formed in a cylindrical shape. In addition, the shaft 500 may be formed of a metal material. In addition, the shaft 500 may be coupled to the rotor core 310 in a press-fitting manner.

The busbar 600 may be disposed above the stator 400.

In addition, the busbar 600 may be electrically connected to the coils 430 of the stator 400.

The busbar 600 may include a busbar body (not shown) and a plurality of terminals (not shown) disposed in the busbar body. In this case, the busbar body may be a mold product formed through an injection molding process. In addition, each of the terminals may be electrically connected to the coil 430 of the stator 400.

In this case, the busbar 600 may also be removed from the motor 1. For example, holes may be formed in the cover 200 so that the coils 430 are exposed, and power may be directly applied to end portions of the coils 430 exposed through the holes to drive the motor 1.

FIG. 4 is a view illustrating an example of a motor in which a rotor is disposed according to a second embodiment, FIG. 5 is a perspective view illustrating the rotor according to the second embodiment, and FIG. 6 is a cross-sectional view illustrating the rotor according to the second embodiment.

Referring to FIG. 4, a rotor 300a according to the second embodiment may be disposed instead of the rotor 300 according to the first embodiment in the motor 1.

When the rotor 300a according to the second embodiment is described with reference to FIGS. 5 and 6, since components, which are the same as those of the rotor 300 according to the first embodiment, of the rotor 300a according to the second embodiment are illustrated with symbols which are the same as those of the rotor 300 according to the first embodiment, specific descriptions thereof will be omitted.

Referring to FIGS. 4 to 6, the rotor 300a according to the second embodiment may include a rotor core 310a and a plurality of magnets 320 disposed on an outer circumferential surface of the rotor core.

The rotor core 310a may be formed in a form in which a plurality of circular thin steel plates are stacked or a single cylindrical form. A hole coupled to the shaft 500 may be formed at a center C of the rotor core 310a.

Referring to FIGS. 5 and 6, the rotor core 310a may include a first region 311, a second region 312 disposed outside the first region 311, first protrusions 313 formed to protrude from an outer circumferential surface 312c of the second region 312, and second protrusions 314 formed to protrude from the outer circumferential surface 312c of the second region 312.

When the rotor 300a according to the second embodiment is compared to the rotor 300 according to the first embodiment, there is a difference in that the rotor 300a according to the second embodiment further includes the first protrusions 313.

In this case, a length L1 of the first region 311 in a shaft direction may be smaller than a length L2 of the second region 312 in the shaft direction.

In addition, since a step is formed between the first region 311 and the second region 312, a groove H may be formed inside the rotor core 310a. In addition, a first bearing 700 or a second bearing 800 may be disposed in the groove H.

The first protrusions 313 may guide an arrangement of the magnets 320. In addition, the first protrusions 313 are disposed above and under the magnets 320 to prevent movement of the magnets 320. Referring to FIGS. 5 and 6, the plurality of first protrusions 313 may protrude from each of an upper portion and a lower portion of the outer circumferential surface of the second region 312 in a radial direction. Accordingly, the magnets 320 may be disposed between the first protrusions 313 to be in contact with the first protrusions 313 in the shaft direction.

Referring to FIG. 5, the first protrusions 313 may be formed to extend from upper portions and lower portions of the second protrusions 314 in a circumferential direction. Accordingly, the first protrusions 313 and the second protrusions 314 may be integrally formed. As illustrated in FIG. 5, each of the first protrusions 313 and the second protrusions 314 may be formed in an "I" shape when viewed in the radial direction. In this case, an example in which the first protrusions 313 and the second protrusions 314 are integrally formed is described, but the present invention is not necessarily limited thereto. For example, the first protrusions 313 may also be disposed to be spaced apart from the second protrusions 314 in the circumferential direction.

Referring to FIG. 6, based on the outer circumferential surface 312c of the rotor core 310a, a protruding length L4 of the first protrusion 313 in the radial direction is smaller than a protruding length L5 of the magnet 320 in the radial direction. Accordingly, a leakage of a magnetic flux due to the first protrusion 313 may be minimized.

In addition, since a region on which an adhesive member (not shown) may be sprayed is extended due to the first protrusion 313, a fixing force of the first protrusion 313 to the magnet 320 may be further increased.

Meanwhile, based on the outer circumferential surface 312c of the rotor core 310a, a protruding length of the second protrusion 314 in the radial direction is smaller than the protruding length L5 of the magnet 320 in the radial direction. Accordingly, based on the center C, a length of the first protrusion 313 and the length of the second protrusion 314 in the radial direction may be smaller than the length of the magnet 320 in the radial direction.

FIG. 7 is a view illustrating an example of a motor in which a rotor is disposed according to a third embodiment, and FIG. 8 is a perspective view illustrating the rotor according to the third embodiment.

Referring to FIG. 7, a rotor 300b according to the third embodiment may be disposed instead of the rotor 300 according to the first embodiment in the motor 1.

When the rotor 300b according to the third embodiment is described with reference to FIGS. 7 and 8, since components, which are the same as those of the rotor 300 according to the first embodiment, of the rotor 300b according to the third embodiment are illustrated with symbols which are the same as those of the rotor 300 according to the first embodiment, specific descriptions thereof will be omitted.

Referring to FIGS. 7 and 8, the rotor 300b according to the third embodiment may include a rotor core 310b and a plurality of magnets 320 disposed on an outer circumferential surface of the rotor core.

The rotor core 310b may be formed in a form in which a plurality of circular thin steel plates are stacked or a single cylindrical form. In addition, a hole coupled to the shaft 500 may be formed at a center C of the rotor core 310b.

Referring to FIG. 8, the rotor core 310b may include a first region 311 and a second region 312 disposed outside the first region 311. In this case, holes 315 into which magnets 320 are inserted may be formed in the second region 312.

When the rotor 300b according to the third embodiment is compared to the rotor 300 according to the first embodiment, there is a difference in that the rotor 300b according to the third embodiment is formed in an interior permanent magnet (IPM) type. Accordingly, there are differences in that the rotor core 310b of the rotor 300b according to the third embodiment includes the holes 315 into which the magnets 320 are inserted and second protrusions 314 are omitted.

In this case, a length L1 of the first region 311 in a shaft direction is smaller than a length L2 of the second region 312 in the shaft direction.

In addition, since a step is formed between the first region 311 and the second region 312, a groove H may be formed inside the rotor core 310b. In addition, a first bearing 700 or a second bearing 800 may be disposed in the groove H.

The holes 315 may be formed in the second region 312 to vertically pass through the second region 312. For example, the hole 315 may be formed from an upper surface 312a of the second region 312 to a lower surface 312b thereof. Accordingly, the magnet 320 may be inserted into and disposed in the hole 315.

Accordingly, since the magnet 320 is disposed in the hole 315 of the second region 312, a size of the rotor 300b in a radial direction is smaller than a size of the rotor 300 in the radial direction. Accordingly, a size of the motor 1 may be further reduced.

As illustrated in FIG. 8, a length L3 of the magnet 320 in the shaft direction may be the same as a length of a stator 400 in the shaft direction. Accordingly, a length of the rotor 300b in the shaft direction may be the same as the length of the stator 400 in the shaft direction.

Accordingly, in a case in which the motor 1 is formed in the IPM type, the motor 1 may output power which is higher than that of a surface permanent magnet (SPM) type motor in which magnets 320 are disposed on an outer circumferential surface of a rotor core 310. In addition, since the motor 1 is implemented in the IPM type, the size of the motor 1 can be further reduced.

While the present invention has been described with reference to the exemplary embodiments thereof, it will be understood by those skilled in the art that various changes in form and details may be made therein without departing from the spirit and scope of the invention as defined by the appended claims.

| [Reference Numerals] | |
|---|---|
| 1: MOTOR | 100: HOUSING |
| 200: COVER | 300, 300A, 300B: ROTOR |
| 310, 310A, 310B: ROTOR CORE | |
| 311: FIRST REGION | 312: SECOND REGION |
| 313: FIRST PROTRUSION | 314: SECOND PROTRUSION |
| 315: HOLE | 320: MAGNET |
| 400: STATOR | 410: STATOR CORE |
| 430: COIL | 500: BUSBAR |
| H: GROOVE | |

The invention claimed is:

1. A motor comprising:

a shaft;

a rotor having a hole to couple to the shaft;

a stator disposed to correspond to the rotor;

a housing in which the stator and the rotor are accommodated;

a cover disposed on the housing; and a busbar disposed above the stator, wherein the rotor includes a rotor core and a plurality of magnets disposed on the rotor core, the rotor core includes a first region coupled to the shaft and a second region disposed outside the first region, an upper portion or a lower portion of the second region overlaps a bearing coupled to the shaft in a radial direction, the busbar is disposed outside a cover protruding portion protruding downward from a lower surface of the cover, a coil of the stator is electrically connected to the busbar, the bearing includes a first bearing disposed on a lower portion of the shaft and a second bearing disposed on an upper portion of the shaft, the second bearing is disposed inside the cover protruding portion, the second bearing includes an upper surface and a lower surface disposed in an axial direction, and both the upper surface and the lower surface of the second bearing overlap the second region of the rotor core in a radial direction.

2. The motor of claim 1, wherein a length (L1) of the first region in a shaft direction is smaller than a length (L2) of the second region in the shaft direction.

3. The motor of claim 2, wherein a length (L3) of the magnet in the shaft direction is greater than the length (L1) of the first region in the shaft direction and smaller than the length (L2) of the second region in the shaft direction.

4. The motor of claim 2, wherein:
the rotor core includes a plurality of first protrusions protruding from an upper portion and a lower portion of an outer circumferential surface of the second region in the radial direction; and
the magnets are disposed between the first protrusions to be in contact with the first protrusions in the shaft direction.

5. The motor of claim 4, wherein:
the rotor core includes a plurality of second protrusions protruding from the outer circumferential surface of the second region in the radial direction; and
the second protrusions are disposed between the magnets in a circumferential direction.

6. The motor of claim 5, wherein:
the first protrusion is formed to protrude from each of an upper portion and a lower portion of the second protrusion in the circumferential direction; and
a length of the first protrusion and a length of the second protrusion in the radial direction are smaller than a length of the magnet in the radial direction.

7. The motor of claim 2,
wherein the first bearing is disposed inside a housing protruding portion protruding upward from a lower surface of the housing.

8. The motor of claim 7, wherein:
the housing includes a third protrusion protruding inward from an upper end of the housing protruding portion; and
the third protrusion is in contact with an outer wheel of the first bearing.

9. The motor of claim 7,
wherein the second bearing does not overlap with the magnet in the radial direction.

10. The motor of claim 9, wherein:
the cover includes a fourth protrusion protruding inward from a lower end of the cover protruding portion; and
the fourth protrusion is in contact with an outer wheel of the second bearing.

11. A motor comprising:
a shaft;
a rotor having a hole to couple to the shaft;
a stator disposed to correspond to the rotor;
a housing in which the stator and the rotor are accommodated;
a cover disposed on the housing; and
a busbar disposed above the stator,
wherein the rotor includes a rotor core and a plurality of magnets disposed on the rotor core,
the rotor core includes a groove concavely formed in an upper surface or a lower surface of the rotor core, the rotor core includes a first region coupled to the shaft and a second region disposed outside the first region,
a bearing coupled to the shaft is disposed in the groove,
the busbar is disposed outside a cover protruding portion protruding downward from a lower surface of the cover,
a coil of the stator is electrically connected to the busbar,
the bearing includes a first bearing disposed on a lower portion of the shaft and a second bearing disposed on an upper portion of the shaft,
the second bearing is disposed inside the cover protruding portion,
the second bearing includes an upper surface and a lower surface disposed in an axial direction, and
both the upper surface and the lower surface of the second bearing overlap the second region of the rotor core in a radial direction.

12. The motor of claim 11, wherein:
a length (L1) of the first region in a shaft direction is smaller than a length (L2) of the second region in the shaft direction.

13. The motor of claim 12, wherein a length (L3) of the magnet in the shaft direction is greater than the length (L1) of the first region in the shaft direction and smaller than the length (L2) of the second region in the shaft direction.

14. The motor of claim 12, wherein:
the rotor core includes a plurality of first protrusions protruding from an upper portion and a lower portion of an outer circumferential surface of the second region in the radial direction; and
the magnets are disposed between the first protrusions to be in contact with the first protrusions in the shaft direction.

15. The motor of claim 14, wherein:
the rotor core includes a plurality of second protrusions protruding from the outer circumferential surface of the second region in the radial direction; and
the second protrusions are disposed between the magnets in a circumferential direction.

16. The motor of claim 15, wherein:
the first protrusion is formed to protrude from each of an upper portion and a lower portion of the second protrusion in the circumferential direction; and
a length of the first protrusion and a length of the second protrusion in the radial direction are smaller than a length of the magnet in the radial direction.

17. The motor of claim 12,
wherein the first bearing is disposed inside a housing protruding portion protruding upward from a lower surface of the housing.

18. The motor of claim 17, wherein:
the housing includes a third protrusion protruding inward from an upper end of the housing protruding portion; and
the third protrusion is in contact with an outer wheel of the first bearing.

19. The motor of claim 17,
wherein the cover includes a fourth protrusion protruding inward from a lower end of the cover protruding portion; and
the fourth protrusion is in contact with an outer wheel of the second bearing.

20. The motor of claim 2, wherein the second region includes a hole configured for insertion of the magnet.

* * * * *